United States Patent Office 3,305,401
Patented Feb. 21, 1967

3,305,401
ELECTRODES FOR GALVANIC PRIMARY AND SECONDARY CELLS AND METHODS OF PRODUCING SUCH ELECTRODES
Sven Olof Aulin, Lidingo, Sweden, assignor to Svenska Ackumulator Aktiebolaget Jungner, Stockholm, Sweden, a corporation of Sweden
No Drawing. Filed Oct. 7, 1963, Ser. No. 314,490
Claims priority, application Sweden, Oct. 10, 1962, 10,845/62
7 Claims. (Cl. 136—120)

The present invention relates to electrodes for galvanic primary and secondary cells of the type including a conductor of perforated sheet, wire gauze or perforated foil and active mass, and has for an object an improved electrode of the above type which is mainly characterized in that the particles of the active mass are provided with a coating of metal deposited on their surface.

The invention further relates to methods of producing electrodes according to the same.

Electrodes intended for galvanic cells which comprise a conductor of sheet, wire gauze or foil and an active mass have long been known. Particularly, in connection with alkaline cells two main types of such electrodes have been utilized. One of these, and that is the original construction, consists of tubes or pockets of perforated metal sheets, in which the active mass is enclosed, and joined to make an electrode. The other type has been developed later, in which one has tried to amplify the electronically conducting connection between the conductor and the active mass by making a porous skeleton of metal by means of sintering, in which the active mass is kept. Methods have also long been known according to which a skeleton is produced by means of electrolytically depositing metal upon particles or fibres of a conductive material, or insulating material, which have previously been made conductive, whereupon the active mass is precipitated in such a skeleton. The active mass may be precipitated by a chemical or electro-chemical process from a solution absorbed by the skeleton. There are also other methods for direct precipitation of active mass into the skeleton electro-chemically from a bath into which the skeleton is suspended. Finally, there is another known method in which metal is precipitated on the particles of the active mass, whereupon these particles are sintered to form an electrode plate.

All of the electrode constructions produced by the aforesaid methods suffer from certain drawbacks. Cells assembled from the first mentioned tubular or pocket electrodes of the kind known heretofore frequently are unable to deliver discharge currents of such magnitudes as are in some cases desired. Electrodes with a sintered or pressed skeleton of the kind known heretofore are on the other hand able to deliver comparatively large discharge currents, but the methods of their manufacture are time-consuming and expensive and difficult to control with reference to the capacity of the finished electrodes. Both kinds of electrodes utilize only a part of the available active mass for the storage of electric energy, however, whereas the remainder lies inactive in the electrode. In all electrodes this last-mentioned circumstance is considered to depend on the fact that the contact between the conductive structure and the particles of the active mass is insufficient. This factor is considered as determining for the relative ability of the electrodes to deliver large discharge currents.

The present invention is a solution of the primary problem of how to construct and make electrodes which utilize the active mass more effectively and which, at the same time, attain an increased ability to deliver large discharge currents. In principle, this solution consists in the fact that the particles of the active mass have been provided with a coat of a metal, by means of which the crossing resistance between the active mass and the conductor of the electrode has been decreased.

The nature of the invention is further explained by a few embodiments described below. These refer to electrodes with active mass of nickel hydroxide and cadmium oxide or cadmium and a deposit of nickel, but the invention is not limited to such electrodes but comprises every electro-chemical system with the materials suitable for such systems.

According to one embodiment of the invention, the electrode consists of the arrangement known per se comprising pockets or tubes of perforated sheet, which are filled with active mass. According to the invention, the particles of the active mass are provided with a coat of nickel, which has been deposited upon the same. As mentioned above, an amplified contact is obtained between the particles of the active mass and the conductor, pockets or tubes in this case, via the nickel coating deposited upon the particles. The electrode therefore utilizes the active mass more effectively than has hitherto been the case, and it is enabled to deliver comparatively very large discharge currents.

According to a further embodiment, the electrode consists of a nickel wire gauze or a perforated nickel foil which in a manner known per se is provided with a layer of active mass on one or both sides. The particles of the active mass are provided with a deposited coating of nickel. The layers are applied to the wire gauze or the foil, for instance, by means of pasting. Such pasting may be accomplished by the aid of a plastic, which has been made conductive by mixing into it a conductive substance, for instance, graphite.

According to a further embodiment, the active mass is applied to a nickel wire gauze or a nickel foil by pressing after its particles have been coated with a nickel deposit. According to a preferred embodiment, a powder of metal or metal fibres is mixed into the active mass, which, on pressing, have a tendency to felt and give a good mechanical strength to the finished plate. Copper fibres and nickel powder made by thermal decomposition of nickel carbonyl have this character and are suitable for the purpose. A good contact is obtained between the particles of the active mass and the wire gauze or foil via the deposited metal coating and the mixed in metal particles, and the electrode obtains a very good efficiency.

The deposition of the nickel on the particles of the active mass may be accomplished, for instance, chemically. There are developed commercial methods for this, based upon precipitation by reduction of a nickel salt solution in which the particles are dispersed. Such details are not within the scope of the present invention, however, and need no further description. There are other methods known to the trade, for instance, coating by vaporizing of metal in vacuum, or coating by thermal decomposition of carbonyls, the particles which should be coated taking up the precipitated metal by adsorbtion.

In a still further embodiment the electrode consists of a nickel wire gauze or a nickel foil provided on one or both sides with a layer of finely divided active mass, the particles of which have been provided with a metal coating by means of deposition in addition to which this coating is grown together with the gauze or the foil by means of further deposition of nickel, a firm porous skeleton integral with the wire gauze, or the foil respectively, having developed which encloses the active mass.

The active mass may be pressed on to the gauze or the foil, preferably with a gel added to it that can take up water or some other fluid in which a nickel salt can dissociate. Owing to the fact that the active mass has electrically conductive properties, nickel may be electrolytically deposited on its particles from a suitable nickel bath into which the pressed plate is suspended as a cathode. Gradually the deposits formed on the particles and the gauze grow together to a firm porous nickel skeleton.

The conductivity of the active mass is comparatively low, however, and in order to increase it, it is suitable to deposit chemically a thin nickel layer on the particles of the mass before the pressing of the plate around a nickel gauze or a foil, and before the deposition of the nickel skeleton. In order to further increase the conductivity of the pressed plate of active mass a finely divided nickel powder may be mixed into the same.

It is suitable, in order to facilitate an effective distribution of the deposit of nickel within the plate of active mass, to add to the active mass a nickel salt or a concentrated solution of a nickel salt from which the skeleton may mainly be deposited. If possible, the quantity of nickel salt should be equal to the quantity needed for the formation of the skeleton. The necessary nickel ions are then evenly distributed within the plate and will be discharged and deposited at the nearest lying conductive particle of the plate. As has been mentioned above, it is suitable to add a gel to the active mass which is able to take up a fluid in which the nickel salt can dissociate and from which the skelton is to be deposited. This gel has a double function. On the one hand, it serves to mechanically keep together the pressed plate of active mass, possibly of active mass mixed with nickel powder and/or nickel salt, so that it does not disintegrate during the galvanic deposition. On the other hand, it serves as an effective damper of the movements of the nickel ions, and by this means it contributes to facilitating the distribution of the galvanic deposit. If the speed of movement of the ions is decreased to such a degree that the resistance of the electrolyte will be equal to that of the active mass, an even deposition within the electrode plate will be facilitated. Otherwise, it is more difficult to prevent a major part of the nickel from being deposited, for instance, on the gauze or the foil. This gel should have the ability to take up not only water but also other fluids, for instance, acetone or alcohol in which the nickel salt can dissociate. It may be desirable to use a fluid other than water for the dissociation of the nickel salt in order to regulate the dissociation and thus the conductivity of the electrolyte, and to decrease the hydrogen ion concentration of the bath, and thus more easily avoid the liberation of hydrogen. Liberation of hydrogen may be desirable for obtaining a porous nickel deposit, but hydrogen in statu nascendi may also unfavorably influence the active mass. An uncontrolled hydrogen development may in addition lead to the result that the primarily produced plate will burst.

The following is a concrete example of the performance of the method according to the invention:

90 g. nickel hydroxide and 150 g. nickel chloride, free of crystal water, are ground and sifted through a sieve with a mesh width of 0.08 mm. The powders mentioned are mixed with 80 g. carbonyl nickel powder, which has been sifted through the same sieve. The mixing is done in a slowly rotating drum until samples taken out from different parts of the batch show the same composition. The powder mixture is then warmed up and mixed with 30 g. of a warm 5% solution of gelatine in water. When a uniform paste has been obtained, it is spread on both sides of a wire gauze and cooled. The plate thus obtained is suspended in a cold 15% solution of sodium chloride and electrolysed as a cathode. When it is estimated that the nickel of the nickel chloride has been deposited, the plate is washed in hot water until the gelatine and the chloride ions have been removed. It is then finished.

It has been mentioned above that an addition of a gel is suitable for preventing the layer of active mass, etc. from disintegrating during the galvanic deposition of nickel. Such a protective effect may also be obtained by surrounding the gauze or the foil with its layers by a shell of a gel, for instance, by simple dipping into a solution of the gel. Additionally, in the case when the layers contain a gel, it may be advantageous to surround the construction with a shell of a further gel which may then have other qualities than the mixed-in gel. In that way, it is possible to choose the qualities of the mixed-in gel mainly with regard to the regulation of the conductivity of the electrolyte, whereas the shell of the further gel may be chosen mainly with regard to the need of a protection around the gauze or foil with its layers. This shell should have a less ability to swell in the electrolyte of the galvanic bath, which may, for instance, consist of a water solution of sodium chloride, if all nickel salt needed has been mixed into the layers. In that case, it is important that the speed of diffusion in the outer shell be so low that the nickel solution will not diffuse out. Several gels of suitable nature are available on the market.

Certain of the constituents of the original layers on the gauze or the foil give rise to a remaining porosity, after the electrolytic deposition has been completed and may cause a lower capacity per unit of volume of the electrode. Such capacity may be increased by compressing the electrode, which may be done by pressing or rolling.

Those skilled in the art will appreciate that the methods mentioned above may be modified. Thus, a primarily produced plate containing, for instance, active mass, nickel salt and a uniting gel could be electrolysed between two plates forming the anode. Further, it is evident that the methods mentioned could be developed into continuous processes of production, generally along the same lines that have already come into use in other connections.

What is claimed is:

1. A method of producing an electrode for primary and secondary cells in which the active mass is utilized more effectively and which is characterized by the ability to deliver discharge currents of greater magnitude comprising the steps of coating particles of an active mass with a metal to provide a porous metal coating thereon, and then applying a layer of the metal coated active mass particles to a perforated conductor, and depositing a porous metallic coating on said layer and upon said conductor to provide a firm porous skeleton integral with said conductor and enclosing said active mass.

2. The method according to claim 1 wherein the porous metal coating deposited on said layer and upon the conductor is deposited galvanically.

3. The method according to claim 1 wherein a metal powder is mixed with the metallically coated particles of active mass before a layer thereof is applied to the conductor.

4. The method according to claim 1 including the step of mixing a gel into the active mass.

5. The method according to claim 1 including the step of providing the conductor and its respective layers with a coating of a gel.

6. The method according to claim 1 including the additional step of compressing the formed electrode by means of pressing.

7. The method of producing an electrode for galvanic primary and secondary cells comprising the steps of mixing nickel hydroxide powder and nickel chloride powder with carbonyl nickel powder until a uniform mixture is obtained, heating the powder mixture and mixing it with a warm 5% solution of gelatin in water to obtain a uniform paste, spreading the paste on both sides of wire gauze to provide a plate, cooling the plate, suspending the plate in a cold 15% solution of sodium chloride and electrolyzing the plate as a cathode until the nickel of the nickel chloride has been deposited, and washing the plate in hot water until the gelatin and the chloride ions have been removed.

References Cited by the Examiner

UNITED STATES PATENTS

| | | | |
|---|---|---|---|
| 2,654,795 | 10/1953 | Brill et al. | 136—120 |
| 2,678,343 | 5/1954 | Daniel | 136—120 |
| 2,853,403 | 9/1958 | Mackiw et al. | 117—100 |
| 2,902,530 | 9/1959 | Eisen | 136—120 |
| 3,006,821 | 10/1961 | Haring | 136—120 |
| 3,137,594 | 6/1964 | Bikerman | 136—120 |

WINSTON A. DOUGLAS, *Primary Examiner.*

A. SKAPAR, *Assistant Examiner.*